April 7, 1936. H. J. L. FRANK ET AL 2,036,265
ELECTRICAL DISTRIBUTION SYSTEM
Filed Dec. 31, 1934

INVENTORS
Harrison J. L. Frank
William A. Harper
BY
Daniel G. Cullen
ATTORNEY.

Patented Apr. 7, 1936

2,036,265

UNITED STATES PATENT OFFICE 2,036,265

ELECTRICAL DISTRIBUTION SYSTEM

Harrison J. L. Frank and William A. Harper, Detroit, Mich., assignors to Bulldog Electric Products Company, Detroit, Mich., a corporation of West Virginia Application December 31, 1934, Serial No. 759,872

5 Claims. (Cl. 247—3)

This application relates to electrical distribution systems of the duct and trolley type.

An electrical distribution system of the duct and trolley type comprises a long run of duct containing bus bars and having a wall provided with a slot which forms a riding path for a portion of the trolley, the trolley having a head part which rides within the duct and a handle or a tool supporting part which rides outside of the duct, these parts being connected by a portion of the trolley which passes through the slot of the duct and rides in the path provided by such slot.

The duct of such a system is made up of sections which are joined to one another at their ends. In the system here shown the sections are provided with lengths of bus bars which are substantially coterminous with the duct sections and the lengths of bus bars are mutually joined at the duct section junctures, these junctures being so constructed as to provide access into the interior of the duct for physically and electrically connecting the lengths of bus bars. In the system here shown the duct junctures are so constructed as to form satisfactory cable entrance boxes whereby cables from outside the duct may be physically and electrically connected to the bus bars within the duct at bus bar and duct section junctures. Further, in the system here shown, the duct junctures are so constructed as to provide hangers for the duct run, it being observed that the provision of hangers at the points of duct section juncture is an eminently satisfactory manner of facilitating exact alignment between duct sections at the ends thereof, and for insuring smooth continuity of the bus bars and rails or tracks of the duct run.

While systems generally of the character here disclosed have been heretofore known, the system here disclosed contains many novel details of manufacture and construction which tend to make the system here disclosed an eminently satisfactory one. For an understanding of these details, reference should be had to the accompanying drawing. In the drawing, Fig. 1 is a side elevation of a duct run at a portion thereof which is formed as a duct section juncture, a bus bar juncture, a cable entrance, and a duct hanger;

Figure 1:
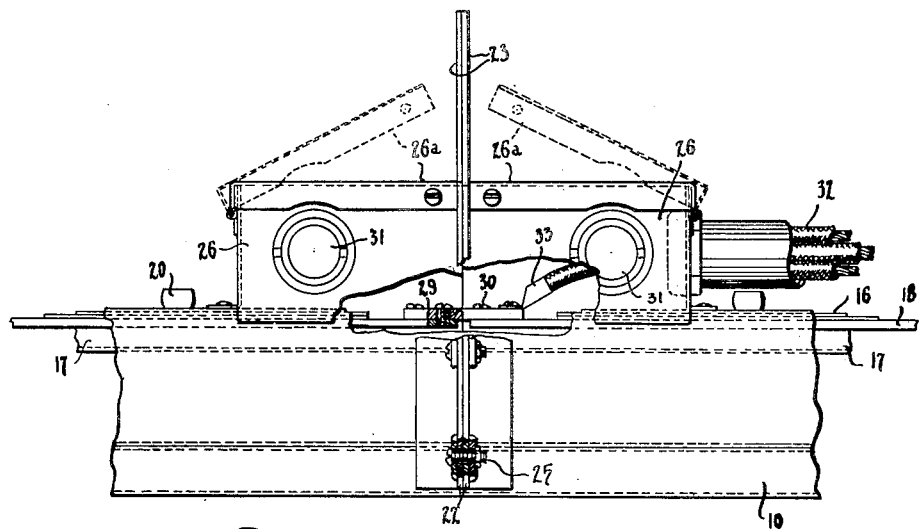
Figure 2:
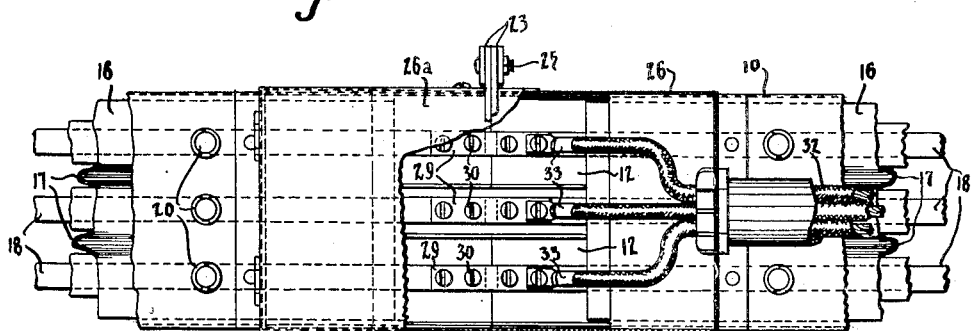
Fig. 2 is a partially cut-away and sectional plan view thereof, as if looking down on Fig. 1.
Figure 3:
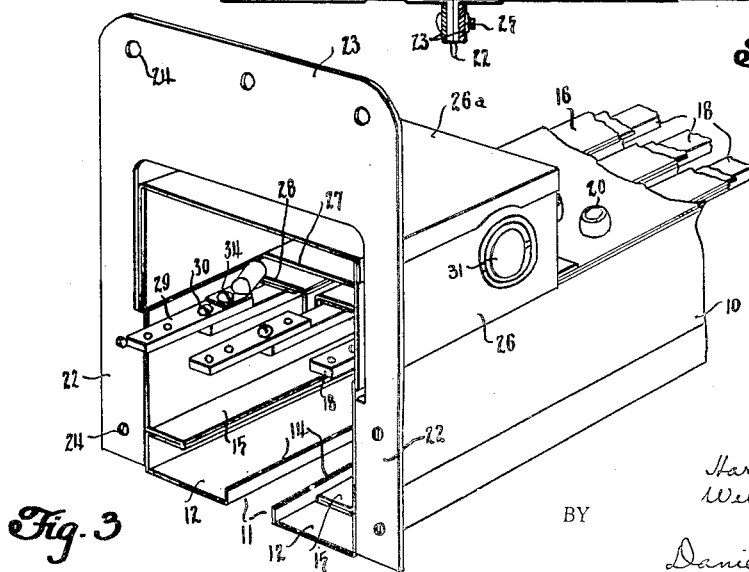
Fig. 3 is a perspective view of an end of a duct section.

The duct of Figs. 1–3 is made up of a plurality of similar duct sections 10. Each is of box-like rectangular cross-section and has its bottom wall slotted as at 11 to provide a path or runway for the portion of a trolley which passes through the duct and connects the head portion of the trolley with the depending portion. The portions of the bottom wall on opposite sides of the slot, and separated by the slot, are referenced 12, and these are intended to provide tracks for rollers of trolleys, and are therefore rigidified by means of edge flanges 14 which bound the edges of the slot 11. Secured to the sides of the duct sections and disposed parallel to the tracks 12 are shelves 15 which are intended to provide guides for the trolley roller wheels that ride on tracks 12, the tracks 12 and the guides 15 restraining the roller wheels from up and down movement in the duct.

The upper wall of each section is provided with a lining of sheet insulation, referenced 16, and this is folded at 17—17 to provide barriers between the bus bars 18 which are disposed adjacent and under the top surface of the duct and are secured thereto by means of screws whose shanks thread into the bus bars from above the duct sections and whose heads are outside of the duct sections and are disposed in cup-shaped insulators 20 swedged over the heads of the screws to shield them from accidental contact with parts outside of the duct.

The duct sections and the lengths of bus bars therein are substantially coterminous and each duct section is fabricated with its bus bars prior to assembly of duct sections with respect to one another to form a duct run. In addition, each end of each duct section is preequipped with a duct section juncture, a bus bar juncture, a duct hanger, and a cable entrance construction, with the result that each end of each duct section is preequipped to resemble the disclosure of Fig. 3.

Referring to this figure, it will be observed that at each end of each duct section there is secured on the vertical side walls of the duct section, angle irons 22 integral with which are formed U-shaped hanger plates 23, there being apertures 24 through the angle irons and hanger plates for receiving bolts 25 passing through them whereby the end of one duct section may be relatively secured to the similar end of a second duct section, with the angle irons and hanger plates of one end disposed in abutting relation with respect to those of the adjacent duct section end. Secured to and disposed on the top surfaces of the duct sections, behind the hanger plates 23, are boxes 26 having hinged covers 26a and these boxes form protective housings over the open tops of the duct sections, these being open on their tops by virtue of the fact that each duct section top surface is cut away on a line 27 to expose the bus bars 18 therein, it being observed that the insulation 16 is also cut away near the line 27 on a line 28 slightly in advance of the line 27 whereby it will be certain that no part of a bus bar will be in proximity to the top wall of the duct without the intervention of a portion of the insulation liner 16.

The bus bars of one section are joined to those of another by means of connectors 29 disposed on the top surfaces of the bus bars in the clearance space provided by the fact that the top surfaces of the duct sections are cut away on lines 27, and these connectors 29 electrically and physically connect the adjacent bus bars through the medium of screws 30 threaded therethru and into tapped holes of the bus bars. It will be observed that the connector construction here shown is such that the connectors 29 are disposed on surfaces of the bus bars which are not engaged by trolley contacts whereby the presence of these connectors does not interfere with the smooth continuity of the rails provided by these bus bars. It will also be observed that the connectors 29 are rigid enough to prevent relative separation and shifting of the bus bars of one section with respect to those of another, and this contradistinguishes the construction here disclosed with constructions heretofore known where bus bars of one section are permitted to shift with respect to and separate from bus bars of another section with the consequent result that the smooth continuity of the bus bar rails often becomes disturbed.

If it is desired to connect an outside cable to a bus bar, this may be done in a very easy manner. The boxes 26 are provided with knock-outs at 31 whereby cables 32 may be admitted into the interior of the boxes from outside. These cables are provided with terminal lugs 33 which may be connected to the connectors 29 by means of screws 34, all in a manner that can readily be observed. Access into the boxes for manipulation of screws 30, 34 is provided by opening the hinged covers of the boxes.

It is clearly apparent from the foregoing that similar duct sections, preequipped so that their ends resemble the showing of Fig. 3, may be joined easily through the medium of the construction shown and that the construction shown provides at one spot means for joining duct sections at their ends, means for joining bus bars at their ends, with access to the bus bar joining means being afforded through the duct juncture means, and with the duct juncture means being formed to provide clearance for the bus bar connectors, means providing a cable entrance box and permitting the formation of a juncture between a cable and a bus bar at the bus bar joint and through the duct section juncture, and means for hanging the duct run constructed to facilitate proper alignment of one section and with respect to its neighbor.

It will also be observed that inasmuch as duct sections may be preequipped with the necessary means for effecting the results described in the foregoing, that the assembly of duct sections with respect to one another may be accomplished readily and easily. Further, it will be observed that in the event that a duct section, after installation, proves or becomes defective, and it becomes necessary to replace that defective section by another, that the task of replacement is very simple. All that is necessary is to remove the bolts and screws at the ends of the defective section, drop out that defective section without disturbing any other section, and insert, to replace that defective section, a new section of the length of the defective section, thereupon joining the ends of the new section to the ends of the previously mounted sections next adjacent through the medium of the bolts and screws.

We claim:

1. A sectional trolley duct composed of duct sections having sections of bus bar therein, means at the adjacent ends of duct sections transverse of the duct run receiving bolts parallel to the duct run for joining the duct sections and for hanging them to fixed structure, means at the adjacent ends of duct sections for connecting the bus bar ends and accessible through openings in a wall of the duct, the latter openings providing means for admitting cables into the interior of the duct at the junctures to be connected to the bus bars at their junctures, and boxes built over such openings.

2. A sectional trolley duct composed of duct sections having sections of bus bar therein and a trolley receiving slot in the bottom wall thereof, means at the adjacent ends of duct sections transverse of the duct run receiving bolts parallel to the duct run for joining the duct sections and for hanging them to fixed structure, means at the adjacent ends of duct sections for connecting the bus bar ends and accessible through openings in a wall of the duct, the latter openings providing means for admitting cables into the interior of the duct at the junctures to be connected to the bus bars at their junctures, and boxes built over such openings, the boxes being on the top wall of the duct opposite the slotted bottom wall thereof.

3. A sectional trolley duct composed of duct sections having sections of bus bar therein, means at the adjacent ends of duct sections transverse of the duct run receiving bolts parallel to the duct run for joining the duct sections and for hanging them to fixed structure, means at the adjacent ends of duct sections for connecting the bus bar ends and accessible through openings in a wall of the duct, the latter openings providing means for admitting cables into the interior of the duct at the junctures to be connected to the bus bars at their junctures, and boxes built over such openings, the boxes being closed normally but having movable covers which may be opened to provide access into the interiors of the boxes and the duct.

4. A sectional trolley duct composed of duct sections having sections of bus bar therein, means at the adjacent ends of duct sections transverse of the duct run receiving bolts parallel to the duct run for joining the duct sections and for hanging them to fixed structure, means at the adjacent ends of duct sections for connecting the bus bar ends and accessible through openings in a wall of the duct, the latter openings providing means for admitting cables into the interior of the duct at the junctures to be connected to the bus bars at their junctures, and movable covers normally closing said openings but openable to provide access into the duct through the openings.

5. A sectional trolley duct composed of duct sections having sections of bus bar therein, means at the adjacent ends of duct sections transverse of the duct run receiving bolts parallel to the duct run for joining the duct sections and for hanging them to fixed structure, means at the adjacent ends of duct sections for connecting the bus bar ends and accessible through openings in a wall of the duct, the latter openings providing means for admitting cables into the interior of the duct at the junctures to be connected to the bus bars at their junctures, and movable covers on the top wall of the duct opposite the slotted bottom wall thereof.

HARRISON J. L. FRANK.
WILLIAM A. HARPER.